Figure 2:
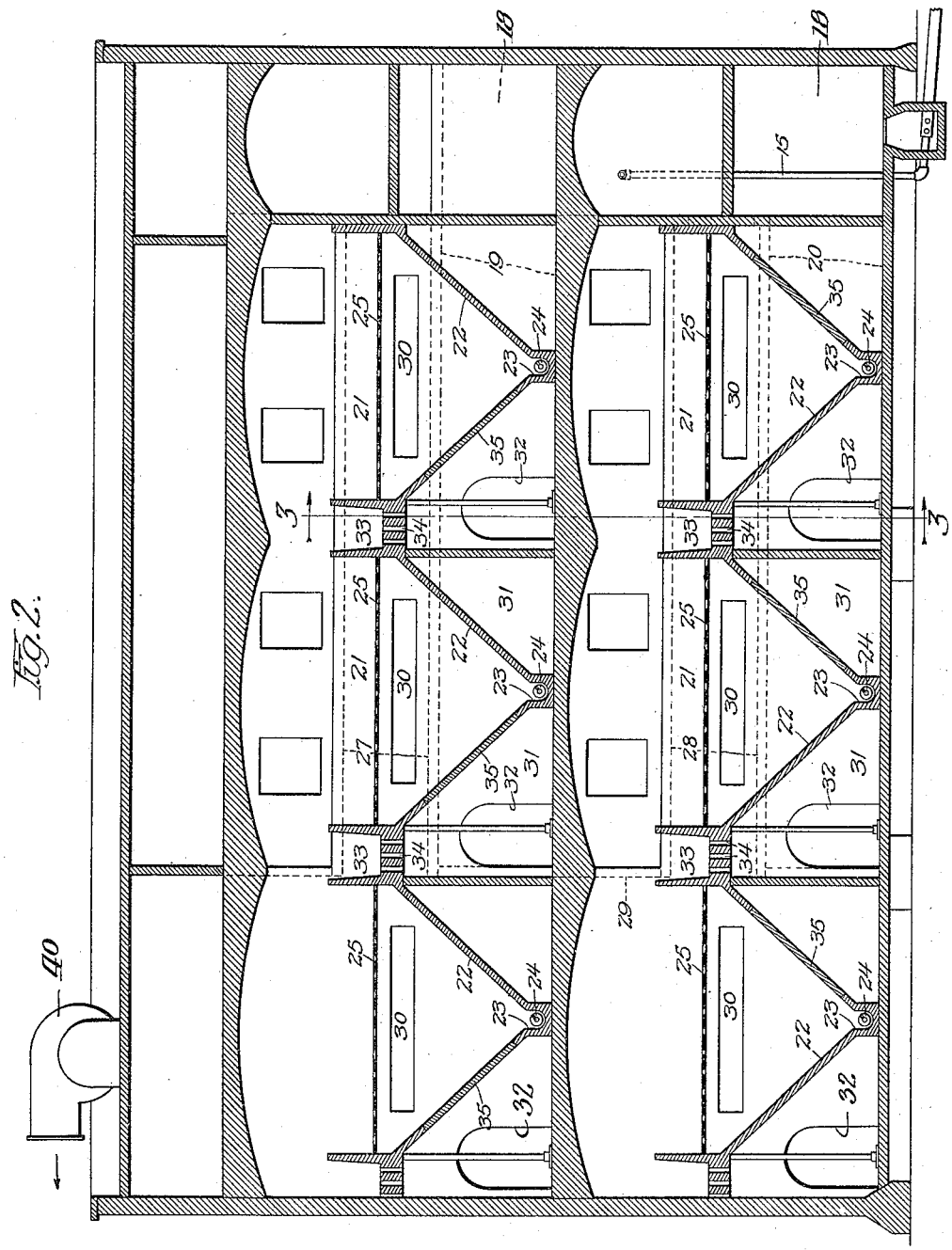

J. F. DORNFELD.
MALTING APPARATUS.
APPLICATION FILED JULY 22, 1912.
1,146,139.
Patented July 13, 1915.
2 SHEETS—SHEET 1.
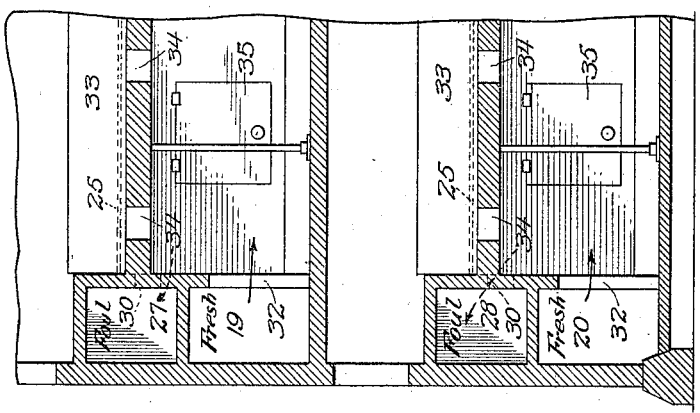
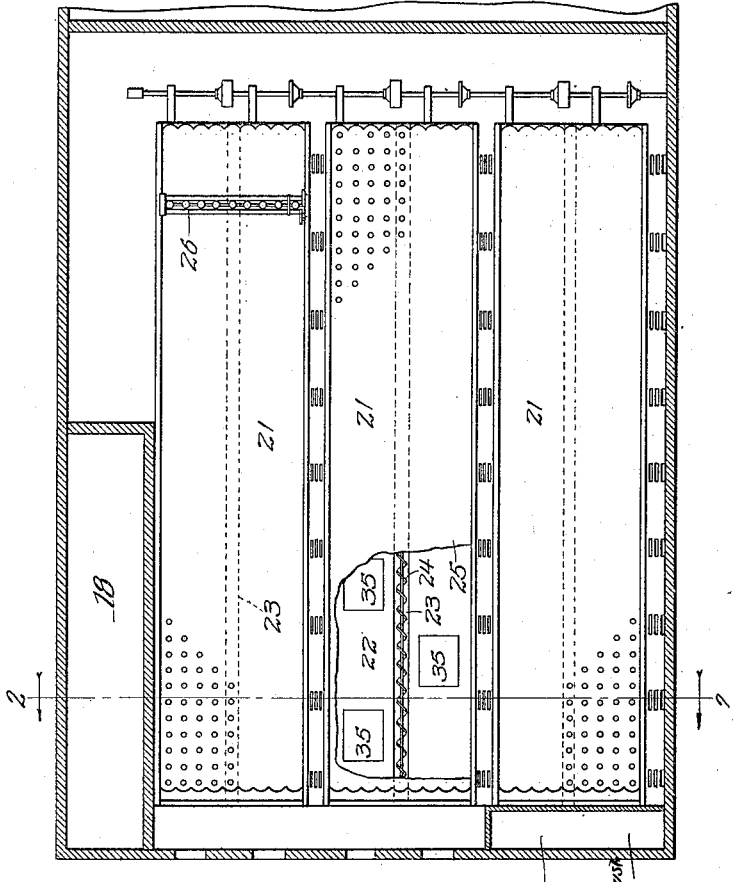

J. F. DORNFELD.
MALTING APPARATUS.
APPLICATION FILED JULY 22, 1912.

1,146,139.

Patented July 13, 1915.
2 SHEETS—SHEET 2.

Witnesses:
Robert N. Weir
J. N. Daggett.

Inventor
John F. Dornfeld.
by Rudolph Wm. Lotz Atty.

UNITED STATES PATENT OFFICE.

JOHN F. DORNFELD, OF CHICAGO, ILLINOIS.

MALTING APPARATUS.

1,146,139.   Specification of Letters Patent.   Patented July 13, 1915.

Application filed July 22, 1912. Serial No. 710,968.

*To all whom it may concern:*

Be it known that I, JOHN F. DORNFELD, citizen of the United States, residing at Chicago, in the county of Cook and State of Illinois, have invented certain new and useful Improvements in Malting Apparatus; and I do hereby declare the following to be a full, clear, and exact description of the invention, such as will enable others skilled in the art to which it appertains to make and use the same.

This invention has for its object to provide a novel apparatus for malting grain, and consists in the features of construction and combinations of parts hereinafter fully described and particularly claimed.

In the accompanying drawings illustrating the invention: Figure —1— is a plan section of a malting floor of the building showing the compartments for containing the grain to be malted. Fig. —2— is a transverse section of the malt house on the line 2—2 of Fig. —1—. Fig. —3— is a fragmentary longitudinal section of the same on the line 3—3 of Fig. —2—.

My invention relates particularly to pneumatic malting apparatus.

It has for its objects, first, to provide a malt house or malting apparatus in which the air tunnels for supplying the attemperated air to the grain and for exhausting the same from the building thereafter are so disposed as to economize space. Second, to provide means whereby the green malt may be economically transported from the several compartments, and whereby said means for economically handling the green malt also serve as means for providing separate air ducts for fresh and foul air respectively, thus economizing space, and, third, to provide means whereby communication may be established between contiguous air ducts for purposes of cleansing the walls and washing down green malt adhering thereto.

In carrying out the malting process by the so-called pneumatic method the air to be passed through the moist and germinating grain in the several compartments is primarily passed through what is usually termed an "attemperating" chamber. Such chambers have been heretofore variously constructed but in all of the same the principles of operation are substantially identical, that is, the water to be evaporated by the air for the purpose of saturating the latter, and at the same time bringing it to the desired temperature, is sprayed or otherwise presented in finely divided form to the passing air currents.

Any suitable form of air moistening and attemperating apparatus may be used in connection with the malting apparatus which I will now proceed to describe and from the former the air is passed through the several ducts hereinafter specifically mentioned to effect its passage through the grain in the germinating compartment.

The air after leaving the air moistening and attemperating chamber referred to passes into the fresh air duct 18 and thence into the fresh air ducts 19 and 20 which pass contiguous to an end wall of the building and laterally of the malting compartments 21 on the several floors, of which two are shown in the drawings. The said compartments 21 are bordered by walls, the upper ends of which are flush with the upper walls of the foul air ducts 27 and 28 respectively. Each of said compartments is equipped with a perforated dumping floor 25 upon which the grain rests. Underneath each of said compartments and extending the entire length thereof is a hopper 22 in the bottom of which is a trough 23 in which suitable conveyers 24 are mounted. The latter serve to convey the green malt dumped into said hoppers 22 from said perforated floors 25. The upper ends of the walls of said hoppers 22 meet the side walls of said compartments upon which the malt-turning machines 26 travel and also meet the vertical walls of the fresh air ducts 19 and 20 and similar walls of the foul or exhaust air ducts 27 and 28, the latter extending parallel with the fresh air ducts 19 and 20 respectively, and being disposed immediately above the latter. Each of said foul air ducts communicates with the vertical foul air duct 29, particularly shown in Fig. —1—. An exhaust fan 40 communicates with the foul air duct 29 to effect forced passage of air through the fresh and foul air ducts. Each of said hoppers is also closed at its other end by means of a vertical wall which is not shown. Openings 30 establish communication between each of said hoppers 22 and one of said foul air ducts. Between contiguous hoppers 22 there is formed a fresh air duct 31 which communicates with the fresh air duct 19 or 20 respectively, through an opening 32, the walls of the hoppers forming a foul air duct underneath each of the perforated floors of the compartment.

Between the side walls of each two contiguous compartments 21 is a passage 33 in the floor of which are openings covered by the grates or similar foraminous means 34 through which communication is established between the malting chamber and the fresh air ducts underneath and between the hoppers, the fresh air being adapted to pass upwardly through said grates or similar foraminous passages into the space above the malting compartments and thence downwardly through the grain and through the perforated floors of the compartments into the hoppers 22 and then outwardly through said openings 30.

The malt-turning machines employed may be of any suitable type, such as are used in what is generally known as the Saladin type pneumatic malt houses which are equipped with rotating helices for stirring the grain and turning it constantly to present it to the action of the fresh air to promote germination. The moist germinating grain packs very closely in the compartments and consequently the fresh air will usually pass most freely therethrough at the point at which the machines are stirring and agitating the malt, as will be obvious.

By means of my relative arrangement of the fresh and foul air ducts and the hopper bottoms below the compartments, I economize a great deal of space besides rendering very convenient the transportation of the green malt from the malting compartments to the kiln, the hopper bottoms serving not only to cause the green malt to be fed into the troughs 23 for transportation by the conveyers 24 but also serving as partition walls between fresh and foul air ducts.

For convenience in cleansing the compartment walls including the inner faces of the hopper walls and promoting the transportation of green malt the said hopper bottoms are provided at intervals with doors 35 which, when closed, fit tightly so as to prevent the passage of air through the openings controlled thereby. Said doors may, however, at the time of emptying a compartment be opened and an operator thus have access to the walls thereof with a hose for the purpose of washing down green malt adhering to said walls and simultaneously keeping the latter clean and sanitary. It is essential, however, that said doors be so constructed as to provide a hermetically sealed joint around the same when closed.

I claim as my invention:

In a pneumatic malt house, a malting floor comprising a plurality of parallel hoppers constituting receptacles for green malt, a foraminous grain supporting surface covering each hopper, parallel vertical walls bordering said surfaces at each side of each hopper, there being passages having floors between the vertical walls bordering the grain-supporting surfaces of each hopper and said floors provided with openings connecting the space above the grain supporting surfaces with fresh air ducts alternating with the hoppers, the latter constituting foul air ducts, a fresh air duct extending transversely of the hoppers and communicating with the fresh air ducts between said hoppers, a foul air duct about and parallel with the transverse fresh air duct communicating with all of said hoppers, and an exhaust fan connected with the foul air duct for effecting forced passage of air from the transverse fresh air duct through the fresh air ducts between the hoppers, thence through the openings in the floors of the passages between the foraminous grain supporting surfaces, thence through the latter into said hoppers and into the transverse foul air duct, the top wall of the latter substantially flush with the upper ends of the vertical walls and providing a raised platform at one end of the grain supporting surfaces, and one vertical wall of said foul air duct providing an end wall bordering each grain supporting surface and coacting with the latter and the first-named vertical walls to form malting compartments.

In testimony whereof I have signed my name in presence of two subscribing witnesses.

JOHN F. DORNFELD.

Witnesses:
M. M. BOYLE,
H. L. HALE.

Copies of this patent may be obtained for five cents each, by addressing the "Commissioner of Patents, Washington, D. C."